United States Patent [19]
Harris et al.

[11] Patent Number: 5,482,379
[45] Date of Patent: Jan. 9, 1996

[54] BALL AND SOCKET BEARING ASSEMBLY HAVING REPLACEABLE COMPOSITE STATIONERY BALL

[75] Inventors: Bernard Harris, Northbrook; Dennis E. Bozych, Downers Grove, both of Ill.

[73] Assignee: Rexnord Corporation, Milwaukee, Wis.

[21] Appl. No.: 131,072

[22] Filed: Oct. 1, 1993

[51] Int. Cl.⁶ .................................................. F16C 23/04
[52] U.S. Cl. ........................................ 384/208; 384/906
[58] Field of Search .................................. 384/541, 906, 384/208, 213, 206

[56] References Cited

U.S. PATENT DOCUMENTS

| | | | |
|---|---|---|---|
| 384,504 | 6/1888 | Braman . | |
| 1,936,863 | 11/1933 | Skillman | 29/149.5 |
| 2,405,148 | 8/1946 | Keahey | 287/100 |
| 2,606,795 | 8/1952 | Hutton . | |
| 2,960,348 | 11/1960 | Sarowski et al. | 280/96.1 |
| 3,240,306 | 3/1966 | Armstrong | 384/541 |
| 3,250,554 | 5/1966 | Roode | 287/87 |
| 3,342,513 | 9/1967 | Melton et al. | 287/90 |
| 3,616,000 | 10/1971 | Butzow et al. | 156/173 |
| 3,697,346 | 10/1972 | Van Dorn et al. | 156/161 |
| 3,700,295 | 10/1972 | Butzow et al. | 308/72 |
| 3,713,932 | 1/1973 | Butzow et al. | 156/173 |
| 3,804,479 | 4/1974 | Butzow et al. . | |
| 3,888,554 | 6/1975 | McCloskey . | |
| 3,891,488 | 6/1975 | White | 156/170 |
| 3,974,009 | 8/1976 | Butzow et al. | 156/84 |
| 4,037,884 | 7/1977 | Bachinger . | |
| 4,842,424 | 6/1989 | Narkon et al. | 384/203 |
| 4,867,889 | 9/1989 | Jacobson | 252/12.6 |
| 5,087,132 | 2/1992 | Tanaka et al. | 384/276 |

FOREIGN PATENT DOCUMENTS

| | | |
|---|---|---|
| 596265 | 4/1960 | Canada . |
| 554879 | 7/1943 | United Kingdom . |
| 840686 | 7/1960 | United Kingdom . |
| 918756 | 2/1963 | United Kingdom . |

*Primary Examiner*—Lenard A. Footland
*Attorney, Agent, or Firm*—Michael, Best & Friedrich

[57] ABSTRACT

A bearing comprising a spherical ball removably mounted in an outer socket. The ball has a bore axis, an insertion axis and are orientation axis orthogonally arranged, an outer spherical bearing surface, diametrically opposed truncations on the outer spherical bearing surface parallel to the bore axis spaced apart a first dimension and end surfaces spaced apart on the bore axis a second axial dimension. The outer socket includes a socket axis, a socket bore extending axially therethrough end portions spaced apart on the socket axis, and an annular inner raceway having a concave configuration presenting a maximum diameter between the socket end portions sufficient to rotatably receive the outer spherical bearing surface of the ball and a minimum socket bore diameter adjacent the end portions that this greater than the spherical ball first and second dimensions so that coaxial alignment of the insertion and socket axis will allow the spherical ball to be inserted into the inner raceway of the outer socket for rotation about the orientation axis to replaceably seat the spherical ball in an installed position within the inner raceway. The ball and socket bearing assembly further includes a clamp member for securing the spherical ball in anti-rotational relation to any support member on which the spherical ball is mounted.

13 Claims, 1 Drawing Sheet

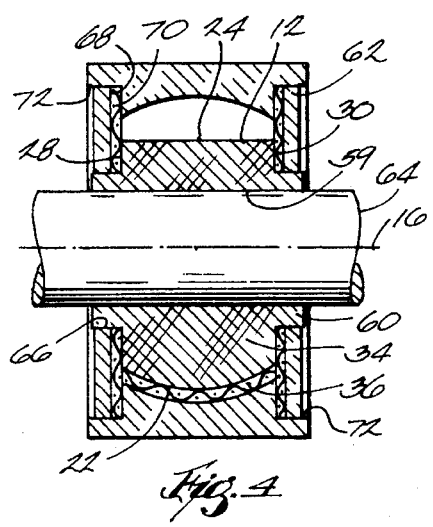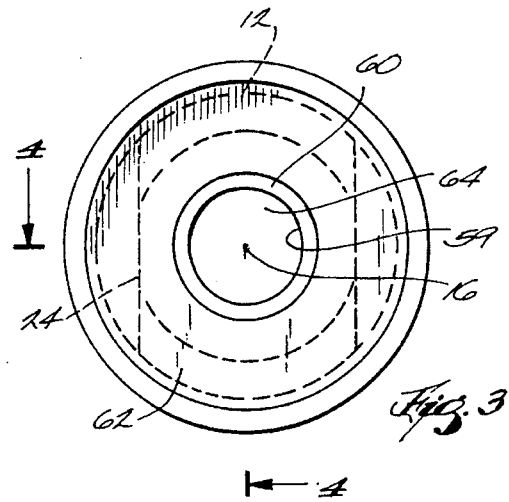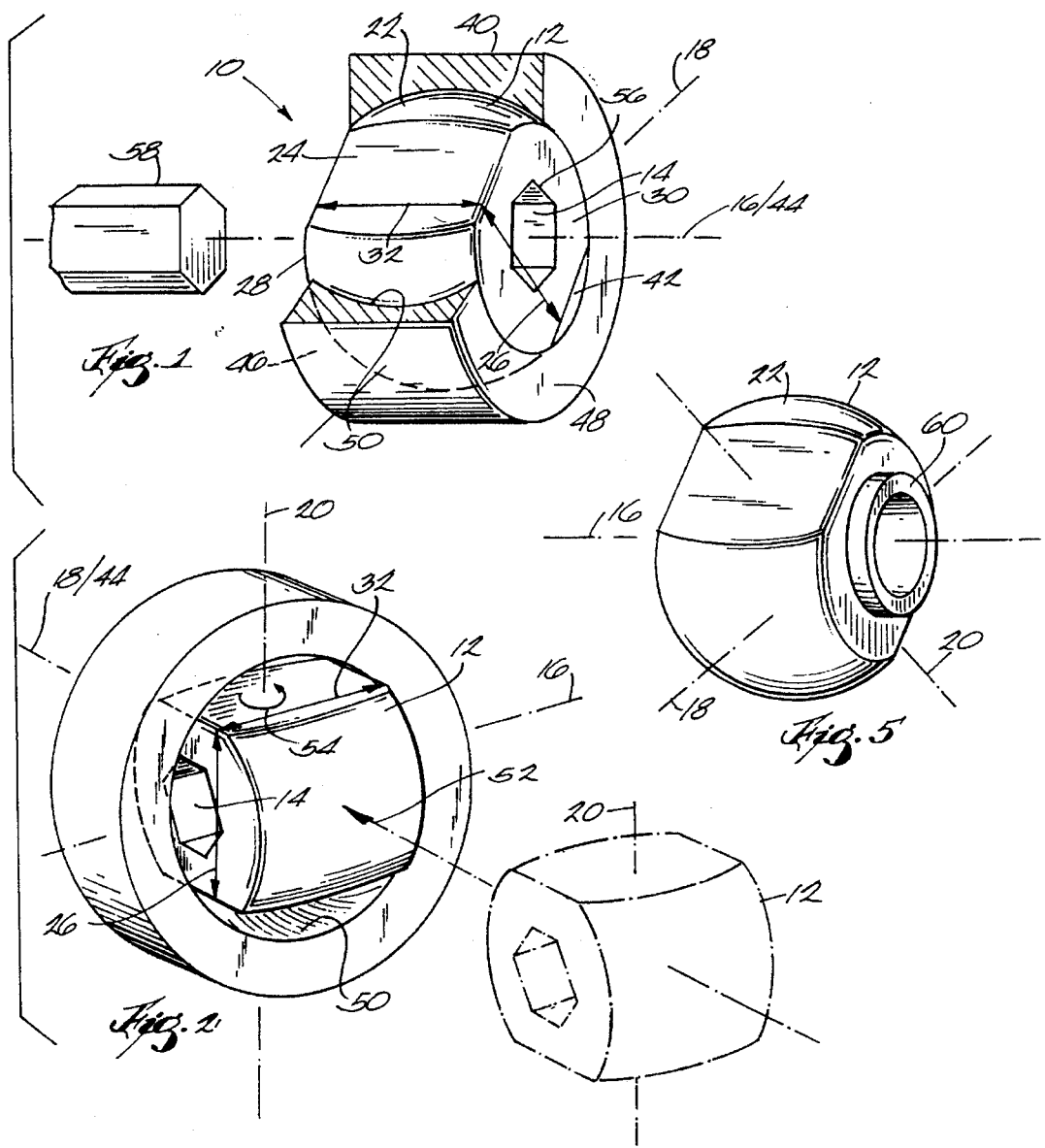

5,482,379

BALL AND SOCKET BEARING ASSEMBLY HAVING REPLACEABLE COMPOSITE STATIONERY BALL

BACKGROUND OF THE INVENTION

This invention relates to a ball and socket bearing wherein the ball is nonrotatably securable on a support and the socket is free to rotate, and more particularly to a ball and socket bearing including a replaceable ball that has an outer spherical bearing surface with truncated flat portions and that is nonrotatably securable on a support.

A two part ball and socket bearing assembly is known from British Patent 554879 by Fredrick George Milles accepted Jul. 22, 1943 wherein a self aligning ball is removably mounted in an outer socket. In this prior art bearing assembly the socket has an annular opening and the ball includes flats extending in planes that are spaced parallel to a cylindrical bore in the ball to provide a reduced outer diameter that will permit the ball to be placed into the socket opening and turned 180° to seat the ball with its cylindrical bore coaxial with the axis of the annular opening in the socket. In this prior art bearing design the ball is always free to rotate about its bore relative to the support shaft it is mounted on which is disadvantageous in some bearing applications.

U.S. Pat. No. 4,842,424 by Narkon et al. issued Jun. 27, 1989 discloses a self aligning three part track roller assembly comprising a fixed inner spherical ball without insertion flats and a two piece outer race subassembly and which is axially separable to allow the spherical ball to be inserted into and removed from the outer race when it is disassembled. This three part bearing is complex and expensive to manufacture and its assembly and disassembly for replacement purposes is not quick and convenient.

SUMMARY OF THE INVENTION

There exists a need not met in the prior art for a two part ball and socket bearing assembly having a ball removably installed in a unitary one piece annular outer socket with the ball non-rotatably mounted on a support member to allow the socket to misalign, oscillate or rotate on the ball. In addition there is a need for a ball and socket bearing of this type that can be manufactured at low cost and which will allow the ball to be easily removed and replaced. There is also a need for a ball and socket bearing of this type wherein the replaceable ball comprises a filament wound fiberglass substrate having a self lubricating material bonded thereon to form an outer spherical bearing surface and which has a high strength to weight ratio.

The bearing assembly comprises a spherical ball removably mounted in an outer socket. The spherical ball includes a ball bore therein having a bore axis, an insertion axis, and an orientation axis, with each of the axes orthogonally arranged relative to each other, an outer spherical bearing surface, diametrically opposed truncations on the outer spherical bearing surface extending parallel to the bore axis spaced apart a first dimension and end surfaces spaced apart on the bore axis a second axial dimension. Preferably the spherical ball will comprise a filament wound fiberglass substrate having a bearing surface of self lubricating material bonded on the spherical bearing substrate. The outer socket includes a socket bore having a socket axis coaxial with the ball bore axis, end portions spaced apart on the socket axis, and an annular inner raceway having a concave configuration presenting a maximum diameter between the socket end portions sufficient to rotatably receive the outer spherical bearing surface of the ball and a minimum socket bore diameter adjacent the end portions that is greater than the spherical ball first and second dimensions so that coaxial alignment of the insertion and socket axis will allow the spherical ball to be inserted into the inner raceway of the outer socket for rotation about the orientation axis to locate the insertion axis normal to the socket axis and thereby replaceably seat the spherical ball in an installed position within the inner raceway. The ball and socket bearing assembly further includes an anti-rotation means for securing the installed spherical ball in stationery nonrotational relation to any support member on which the spherical ball is mounted.

BRIEF DESCRIPTION OF THE DRAWINGS

FIG. 1 is a partially cut-away exploded isometric projection view of a first embodiment of a bearing assembly.

FIG. 2 is a isometric exploded view of the bearing assembly of FIG. 1 with the ball shown in phantom and also in position preparatory for 90° rotation into a seated position in the socket.

FIG. 3 is an end view of a second embodiment of the ball and socket bearing assembly.

FIG. 4 is a cross sectional view of the ball and socket bearing assembly of FIG. 3 taken along line 4—4 of FIG. 3 and showing the bearing assembly.

FIG. 5 is a isometric projection view of the ball which is shown in FIG. 4.

DESCRIPTION OF THE PREFERRED EMBODIMENTS

Referring to FIGS. 1 and 2, the first embodiment of the ball and socket bearing assembly 10 comprises a spherical ball 12 that includes a bore 14 having a bore axis 16 that constitutes the main axis of ball 12. The ball 12 further includes an insertion axis 18 and an orientation axis 20. As best shown in FIG. 2 the bore axis 16, insertion axis 18 and orientation axis 20 are orthogonally arranged relative to each other. The spherical ball 12 also includes an outer spherical bearing surface 22 having diametrically opposed flat truncations 24 thereon spaced apart a first diametrical dimension 26 and which extend parallel to the bore axis 16. The spherical ball further includes end surfaces 28, 30 spaced apart along the bore axis 16 a second axial dimension 32. Preferably the spherical ball 12 comprises a filament wound fiberglass substrate 34 (see FIG. 4) having a self lubricating fabric 36 such as Teflon bonded to the spherical surface 22 thereof with the bonded self lubricating fabric 36 constituting the outer spherical bearing surface of the ball.

The ball and socket bearing assembly also comprises a one piece annular socket 40 that includes a socket bore 42 having a socket axis 44 that is coaxial with the ball bore axis 16 when the bearing is assembled. The outer socket 40 further includes end portions 46 and 48 spaced apart on the socket axis 44 and an annular inner raceway 50 having a concave cross sectional configuration that presents a maximum diameter between the end portions 46, 48 and is configured and dimensioned to rotatably receive the spherical surface 22 of the ball 12. The raceway 50 has a minimum socket bore diameter adjacent the end portions 46, 48 that is slightly greater than the spherical ball first and second dimensions 26, 32.

In order to replaceably insert the spherical ball 12 into the outer socket 40 the insertion and socket axes 18/44 are placed in coaxial alignment with each other as shown in FIG. 2. This allows the spherical ball 12 shown in phantom in FIG. 2 to be moved in the direction of arrow 52 into its solid line position within the outer socket member 40 as shown in FIG. 2. When the spherical ball 12 is within the socket 40 it is rotated about the ball orientation axis 20 in the direction of arrow 54 to coaxially align bore axis 16 with the socket axis 44 and thereby removably place the spherical ball 12 in an installed position within the inner raceway 50 of the outer socket 40 as shown in FIG. 1.

The ball and socket bearing assembly 10 of the first embodiment further includes an anti-rotation means 56 for securing the installed spherical ball 12 in nonrotational relation to the support member 58 on which it is mounted. The anti-rotation means comprises the bore 14 through the spherical ball 12 with an internal configuration 56 that will nonrotatably mate with the external configuration of a support member 58 on which it is to be mounted. The configuration of bore 14 is shown as hexagonal but other noncylindrical cross sectional configurations could be used.

A second embodiment of the invention is shown in FIGS. 3–5 and has special utility in applications where it is necessary to insure that the spherical ball 12 does not misalign. Corresponding components of the second embodiment are numbered the same as in the first embodiment. In the second embodiment the ball 12 is provided with a cylindrical bore 59 for mounting on a cylindrical support member 64. An annular shoulder 60 is provided on at least one of the spherical ball 12 end surfaces 28, 30 in surrounding relation to the cylindrical bore 59. Preferably an annular shoulder 60 will be provided on both of the end surfaces 28, 30. A clamping member in the form of a press fit washer 62 is provided for creating a nonrotating fit between the annular shoulder 60 and the support member 64. The press fit washer 62 has an opening 66 therethrough which is dimensioned to permit the washer to be press fit on annular shoulder 60 which slightly reduces or constricts the shoulder diameter to cause it to nonrotatably clamp the spherical ball 12 to the support member 64.

Preferably the axially inner surface 68 of the washer 62 will comprise a self lubricating material 70 such as Teflon. It is also desirable that the end surfaces 28, 30 of the outer socket 40 be provided with a counterbore at 72 having an axial depth at least equal to the thickness of the washer 62 and its Teflon lining 70. When the washer 62 is inserted into the counter bore 72 the self lubricating material 70 will be placed in sealing engagement against the inner end surface 74 of the counter bore 72. Preferably the bearing assembly will include washers 62 press fit around an annular shoulder 60 on each end surface 28, 30 of the spherical ball 12.

The ball and socket bearing assembly 10 above described has particular utility in cam follower applications where the spherical ball 12 must be stationery (nonrotating) with the outer socket free to rotate while supporting a thrust load which is subject to misaligning. The second embodiment of FIGS. 3–5 has particular utility where it is necessary to insure that the spherical ball does not misalign.

What is claimed is:

1. A ball and socket bearing assembly for mounting on a support member, said ball and socket bearing assembly comprising:

a ball member including a ball bore having a bore axis, an insertion axis, and an orientation axis, said bore axis, said insertion axis, and said orientation axis being orthogonally arranged relative to each other, an outer spherical bearing surface on said substrate, diametrically opposed truncations on said outer spherical bearing surface, said truncations extending parallel to said bore axis and being spaced apart a first dimension along said orientation axis, and end surfaces spaced apart a second dimension along said bore axis, and said ball member including a filament wound fiberglass substrate having a woven self-lubricating fabric bonded on said spherical bearing surface thereof;

a one piece outer socket including a socket axis, a socket bore extending axially therethrough, end portions spaced apart on said socket axis, and an annular inner raceway having a concave configuration presenting a maximum diameter between said end portions sufficient to rotatably receive said spherical bearing surface and a minimum socket bore diameter adjacent said end portions that is greater than said first and second dimensions so that coaxial alignment of said insertion and socket axes will allow said ball member to be inserted into said inner raceway of the outer socket for rotation about said orientation axis after insertion to locate said bore axis coaxial with said socket axis and thereby place said ball member in an installed position within said inner raceway; and an anti-rotation means for securing said installed ball member in non-rotational relation to a support member on which said ball member is mounted.

2. A ball and socket bearing assembly for mounting on a support member, said ball and socket bearing assembly comprising:

a unitary one piece outer socket member having a socket axis and a socket bore extending axially through said socket member, said socket bore being defined by a continuous uninterrupted annular concave inner raceway;

a one piece spherical ball having a main axis, an orientation axis normal to said main axis, a spherical bearing surface dimensioned to be rotatably seated within said inner raceway, diametrically opposed truncations on said bearing surface, said truncations being parallel to said main axis and being spaced apart a first dimension along said orientation axis, and end surfaces spaced apart a second dimension along said main axis, said second dimension permitting insertion of said ball into said socket bore when said socket and main axes are normal to each other for subsequent rotation of said ball when inserted about said orientation axis into a seated position in said outer socket concave inner raceway; and an anti-rotation means for securing said spherical ball when in its seated position in non-rotational relation to a support member on which it is mounted, said anti-rotation means for securing said spherical ball to the support member including a clamp member for clamping said spherical ball to the support member.

3. A ball and socket bearing assembly for mounting on a support member, said ball and socket bearing assembly comprising;

a ball member including a filament wound fiberglass substrate, a ball bore having a bore axis, an insertion axis, and an orientation axis, said bore axis, said insertion axis, and said orientation axis being orthogonally arranged relative to each other, an outer spherical bearing surface on said substrate, diametrically opposed truncations on said outer spherical bearing surface, said truncations extending parallel to said bore axis and being spaced apart a first dimension along said orientation axis, and end surfaces spaced apart a second dimension along said bore axis;

a one piece outer socket including a socket axis, a socket bore extending axially therethrough, end portions spaced apart on said socket axis, and an annular inner raceway having a concave configuration presenting a maximum diameter between said end portions sufficient to rotatably receive said spherical bearing surface and a minimum socket bore diameter adjacent said end portions that is greater than said first and second dimensions so that coaxial alignment of said insertion and socket axes will allow said ball member to be inserted into said inner raceway of the outer socket for rotation about said orientation axis after insertion to locate said bore axis coaxial with said socket axis and thereby place said ball member in an installed position within said inner raceway; and an anti-rotation means for securing said installed ball member in non-rotational relation to a support member on which said ball member is mounted, said anti-rotation means including an annular shoulder on said ball member in surrounding relation to said ball bore on at least one of said end surfaces and a clamp member for creating an non-rotating fit between said annular shoulder and the support member on which said ball member is mounted.

4. The ball and socket bearing according to claim 3 wherein said clamping member comprises at least one clamping washer having an opening dimensioned to permit said clamping washer to be press fit on said annular shoulder to constrict said annular shoulder into non-rotatable engagement with said spherical ball support member.

5. The ball and socket bearing according to claim 4 wherein said clamping washer has a self lubricating surface in sealing engagement with said outer socket end portion.

6. The ball and socket bearing according to claim 4 wherein:

said spherical ball has an annular shoulder on both of said end surfaces; and said clamping member comprises a clamping washer press fit around each of said annular shoulders in facing relation to said socket end portion.

7. The ball and socket bearing according to claim 6 wherein each of said clamping washers has a self lubricating surface in sealing engagement against the outer socket end portion that it faces.

8. The ball and socket bearing according to claim 4 wherein at least one of said outer socket end portions has a counter bore surrounding said outer socket bore, dimensioned and configured for receiving said clamping washer therein.

9. The ball and socket bearing according to claim 8 wherein:

each of said outer socket end portions has a counter bore surrounding said outer socket bore; and said clamping member comprises a clamping washer mounted in each of said counter bores.

10. A ball and socket bearing assembly for mounting on a support member, said ball and socket bearing assembly comprising:

an outer socket member, said outer socket member including an annular inner raceway having a concave longitudinal profile, said annular inner raceway defining a socket bore, said socket bore having a socket axis;

a ball member having a main axis, an orientation axis normal to said main axis, a spherical bearing surface dimensioned to be rotatably seated within said annular inner raceway, diametrically opposed truncations on said bearing surface, said truncations being parallel to said main axis, and said truncations being spaced apart a first dimension along said orientation axis, and end surfaces spaced apart a along said main axis a second dimension that will permit insertion of said ball member into said socket bore when said socket and main axes are normal to each other and subsequent rotation of said ball member, once inserted into said socket bore, relative to said outer socket member and about said orientation axis into a seated position on said inner raceway; and means between said outer socket member and said ball member for preventing misalignment of said ball member relative to said socket member so that said socket axis and said main axis are maintained in substantially coaxial relation when said ball member is in its seated position on said inner raceway.

11. A ball and socket bearing assembly as set forth in claim 10 wherein said means for preventing misalignment of said ball member relative to said socket member includes a shoulder on one of said end surfaces of said ball member, and a misalignment stop mounted on said shoulder, said misalignment stop being engageable with said socket member.

12. A ball and socket bearing assembly as set forth in claim 11 wherein said shoulder is annular, wherein said misalignment stop is a washer press fit onto said annular shoulder, wherein said socket member includes opposite end surfaces, one of which includes an annular recess, and wherein said washer is seated in said annular recess.

13. A ball and socket bearing assembly as set forth in claim 12 wherein said washer includes a self lubricating liner, said liner being in engagement with said annular recess.

\* \* \* \* \*